United States Patent [19]

Shinohara

[11] Patent Number: 5,805,741

[45] Date of Patent: Sep. 8, 1998

[54] IMAGE PROCESSING METHOD AND SYSTEM USING HARMONIC DISTORTION

[75] Inventor: Koichiro Shinohara, Kanagawa, Japan

[73] Assignee: Fuji Xerox Co., Ltd., Tokyo, Japan

[21] Appl. No.: 423,950

[22] Filed: Apr. 19, 1995

[30] Foreign Application Priority Data

May 31, 1994 [JP] Japan .................................. 6-118794

[51] Int. Cl.$^6$ .................................................. H04N 1/409
[52] U.S. Cl. .......................... 382/263; 382/275; 358/447; 358/463
[58] Field of Search ..................... 358/447, 462, 358/463, 448, 465, 466; 382/260, 263, 280, 275; 348/241; H04N 1/409

[56] References Cited

U.S. PATENT DOCUMENTS

| | | | |
|---|---|---|---|
| 4,630,107 | 12/1986 | Takanashi et al. . | |
| 5,166,810 | 11/1992 | Sorimachi et al. | 358/463 |
| 5,245,432 | 9/1993 | Jaffray et al. . | |
| 5,247,588 | 9/1993 | Komatsu | 382/263 |
| 5,251,267 | 10/1993 | Kawamura | 358/447 |
| 5,392,137 | 2/1995 | Okubo | 358/448 |
| 5,526,446 | 6/1996 | Adelson et al. | 382/260 |
| 5,557,429 | 9/1996 | Hirose | 358/463 |

FOREIGN PATENT DOCUMENTS

0451831 A2   10/1991   European Pat. Off. .

3-234178   10/1991   Japan .

OTHER PUBLICATIONS

Sei–ichi Taguchi and Satoru Honjo, "Quality of Digital Images," The Fifth International Congress on Advances in Non–Impact Printing Technologies, Nov. 1989, pp. 383–389.

Primary Examiner—Kim Yen Vu
Attorney, Agent, or Firm—Finnegan, Henderson, Farabow, Garrett & Dunner, L.L.P.

[57] ABSTRACT

An image processing method for converting an image signal G input through an image input unit 11 into image signal G fitted to an image output unit 19. The method comprises the steps of superposing a harmonic component H of the image signal G in response to a level of the image signal G on the image signal G and sending the image signal G on which the harmonic component H is superposed to the image output unit 19. An image processing system for converting an image signal G input through an image input unit 11 into image signal G fitted to an image output unit 19. The system comprises harmonic component generation means 3 for generating a harmonic component H corresponding to the image signal G and harmonic component superposing means 34 for superposing the harmonic component H on the image signal G. Thereby, it is provided an image processing method and system for providing a sharp image good in gradation characteristic and granularity in a wide dynamic range.

11 Claims, 5 Drawing Sheets

IMAGE PROCESSING METHOD AND SYSTEM USING HARMONIC DISTORTION

BACKGROUND OF THE INVENTION

This invention relates to an image processing method and system which can reproduce a good-looking image based on the visual psychology of a human being in a color image copier, etc.

Color reproducibility, gradation reproducibility, sharpness, and granularity are named as important characteristics on considering the quality of an output image of a color image copier, etc. Hitherto, a large number of image processing technologies for reproducing a source document with fidelity have been proposed.

By the way, if a color output image is regarded as information transmission means, the final reception system of the image becomes the visual system of a human being. Thus, it is desired that picture quality design considering the perception characteristics of the visual system based on visual psychology is made for the image processing.

This means that an image modulated for effect can be provided by performing color correction processing in an L* a* b* space, a color perception equivalence space, for example, as disclosed in Unexamined Japanese Patent Publication (Kokai) 3-234178, etc.

However, for spatial frequency processing having a large effect on the sharpness, granularity, and gradation reproducibility of an image, generally a technique of cutting the high-frequency band of a sharpness enhancement filter having a second-order differential (Laplacian) characteristic for compatibility of granularity and sharpness is used. On the other hand, Honjo et al. report the effect of shielding gradation difference caused by noise, so-called pseudo edge as an example of deriving the relationship between image noise and gradation from visual characteristics. ("Paper Summaries of the 5th Intern. Congr. on Advances in Non-Impact Printing Technologies (SPSE), pp.196" held San Diego, Calif. in November 1989) This basic concept is widely applied in the form of a dither method in half tone generation.

In the audio field considering the acoustic psychology of a human being, for example, it is pointed out that a second harmonic (chord) component produced by a vacuum tube audio amplifier, etc., having a secondary amplification characteristic has a good effect on acoustic psychology; in recent years, audio amplifiers using MOSFET having a secondary amplification characteristic instead of transistors having an exponential amplification characteristic have been released. On the other hand, processing focusing attention on the harmonic component is not performed in the image processing field handling the visual psychology.

Not many image signal processing methods based on the visual psychology have been proposed for high-frequency component processing in the conventional image processing systems. Particularly, few processing methods concerning the harmonic component have been proposed.

When the above-mentioned sharpness enhancement processing is performed through a discrete Laplacian filter to improve the sharpness of an image, if the sharpness are enhanced, image noise is also amplified, degrading granularity. In contrast, if the spatial frequency characteristic of the filter is lowered to reduce image noise, a "dull" image with sharpness degraded is generated. Several methods of switching or mixing a number of discrete Laplacian filter coefficients in response to the edge degree, chroma, etc., of an image are proposed, wherein the spatial frequency characteristic needs also to be lowered in an area low in edge degree to prevent interference between an image signal and half-tone dots generated by an output device, leading to lowering the dynamic range and making a defect clear for inconsistency and gradation difference (pseudo edge).

SUMMARY OF THE INVENTION

It is therefore an object of the invention to provide an image processing method and system for providing a sharp image good in gradation characteristic and granularity in a wide dynamic range by focusing attention on a visual psychological characteristic of a harmonic component and superposing the harmonic component.

To the end, according to a first aspect of the invention, there is provided an image processing method for converting an image signal G input through an image input unit 11 into image signal G fitted to an image output unit 19, the method comprising the steps of superposing a harmonic component H of the image signal G in response to a level of the image signal G on the image signal G and sending the image signal G on which the harmonic component H is superposed to the image output unit 19, as shown in FIG. 1A.

According to a second aspect of the invention, there is provided an image processing system for converting an image signal G input through an image input unit 11 into image signal G fitted to an image output unit 19, the system comprising harmonic component generation means 3 for generating a harmonic component H corresponding to the image signal G and harmonic component superposing means 34 for superposing the harmonic component H on the image signal G, as shown in FIG. 1B.

The function of the technical means as described above will be discussed based on FIG. 1B.

In the figure, the harmonic component generation means 3 generates a harmonic component H of an amount corresponding to the level of image signal G. The harmonic component superposing means 34 superposes the generated harmonic component H on the color image signal G.

As a result, the superposed harmonic component has an edge enhancement effect on the edge part of an input image and prevents excessive edge enhancement called ringing from reducing the dynamic range. Further, it also has an effect of canceling the gradation difference by generating distortion of minute amplitude in an area with less spatial density change in which the gradation difference (pseudo edge) is likely to occur. Further, the level of low-frequency noise degrading granularity can be reduced visual-psychologically by providing the harmonic component.

DETAILED DESCRIPTION OF PREFERRED EMBODIMENTS

Referring now to the accompanying drawings, there are shown preferred embodiments of the invention.

Figure 1A:
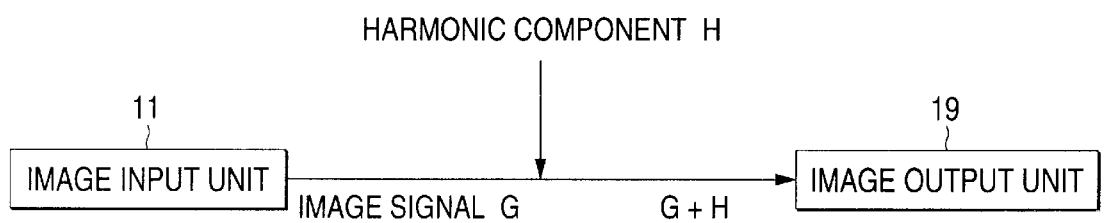
FIGS. 1A and 1B are block diagrams showing the concept of the invention.
Figure 1B:
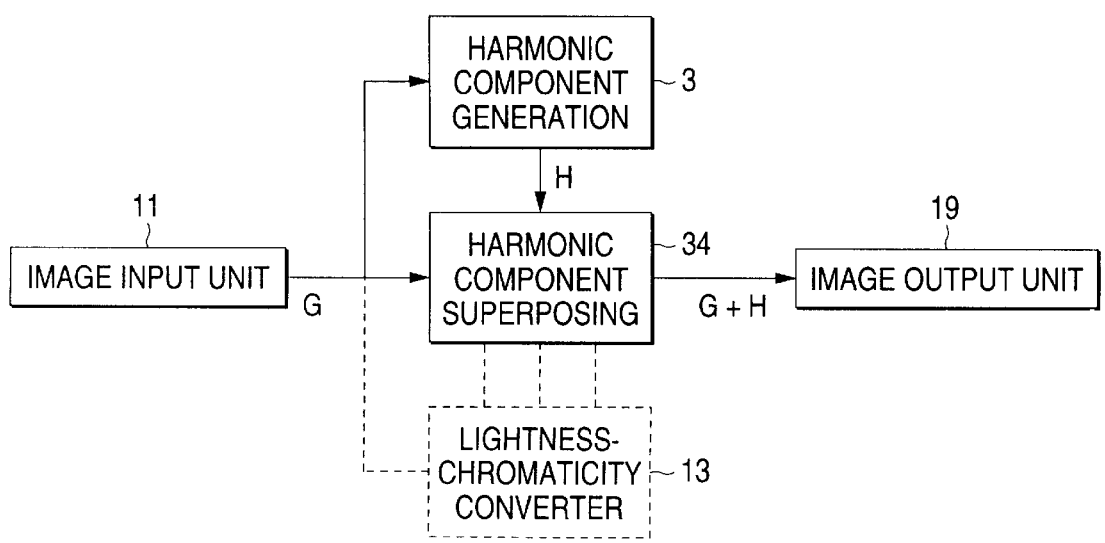
Figure 2:
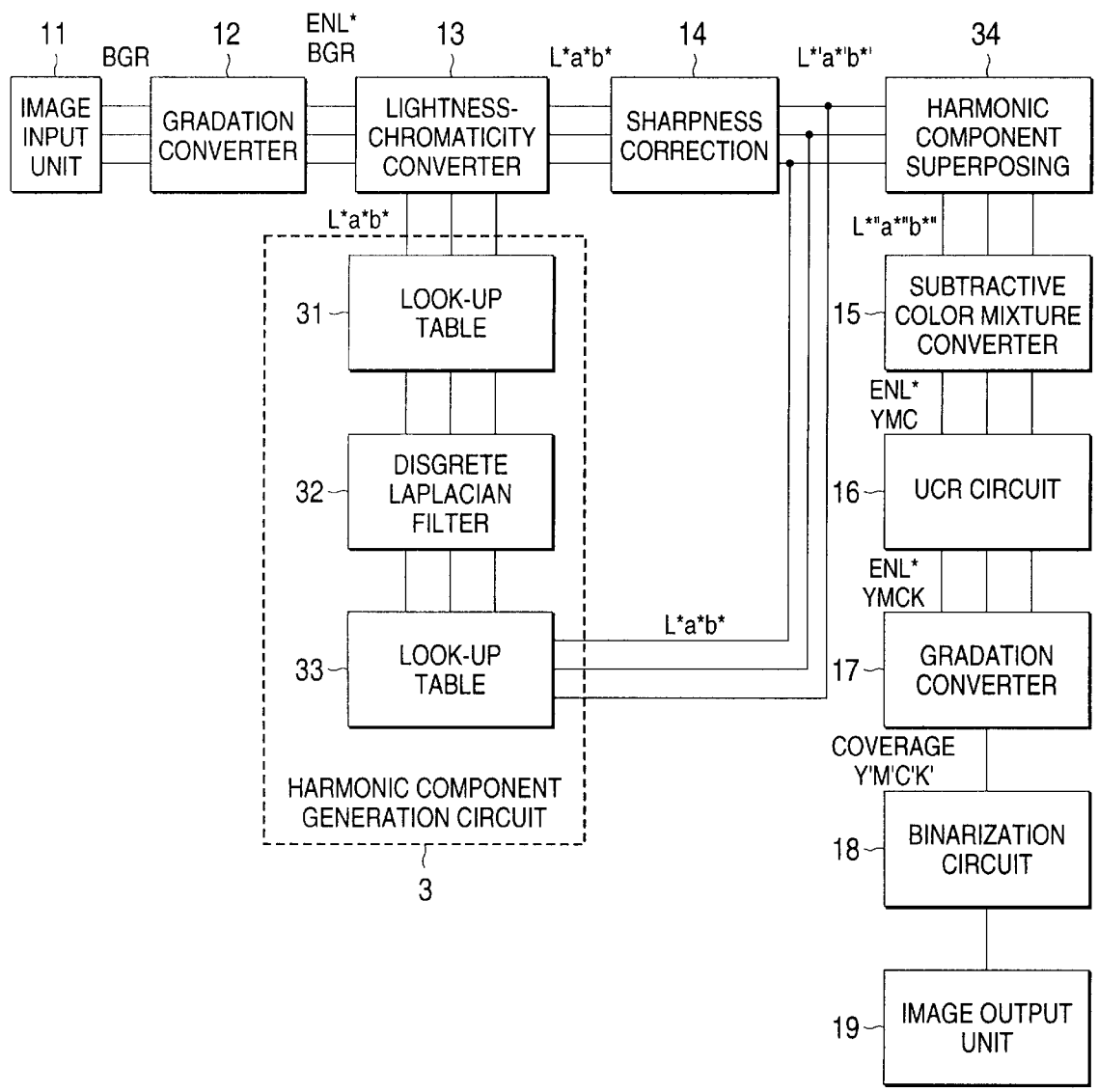
FIG. 2 is a schematic block diagram of a first embodiment of the invention.

First embodiment:

FIG. 2 shows a schematic configuration of a color image copying system according to a first embodiment of the invention. The color image copying system comprises an image input unit 11, a gradation converter 12 for correcting the gradation of an input image signal, a lightness-chromaticity converter 13 for further separating the image signal into lightness and chromaticity signals L*, a*, b*, a sharpness correction circuit 14 for correcting sharpness, a discrete Laplacian filter 32, look-up tables 31 and 33 for making nonlinear conversion of image signal G, a harmonic component superposing circuit 34 for superposing an obtained harmonic component on the image signal, a subtractive color mixture converter 15 for converting the image signal into subtractive color mixture information, a UCR circuit 16 for generating proper Indian ink information, a gradation converter 17 for making a gradation correction of an image output unit, a binarization circuit 18 for binarizing a half tone image in response to the image output unit, and the image output unit 19 for outputting an image. It superposes the harmonic component corresponding to image signal G on the image signal itself.

In the embodiment, the image input unit 11 is a unit reading a color image and converting it into digital data and specifically represents a color television camera, a color image scanner, or the like. In the embodiment, each of R, G, and B components of image signal is represented by eight bits. The gradation converter 12 is a look-up table for converting the R, G, and B components of image signal into equivalent lightness. Further, the lightness and chromaticity converter 13 converts the R, G, and B components converted into equivalent lightness into lightness L* and chromaticity a*, b*. The sharpness correction circuit 14 performs sharpness enhancement processing using discrete Laplacian filter.

Figure 3A:
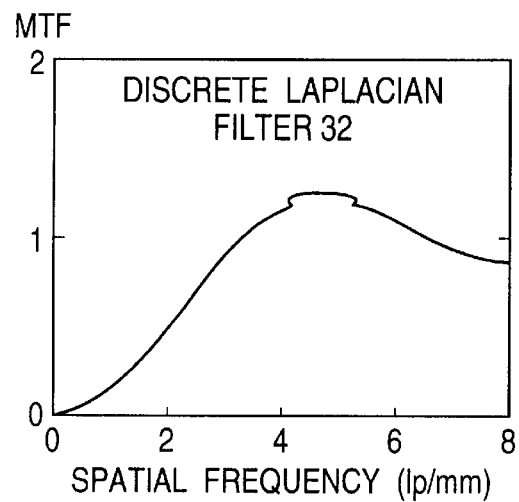
FIGS. 3A–3C are conceptual drawings showing examples of discrete Laplacian filter and table characteristics of the first embodiment of the invention.
Figure 3B:
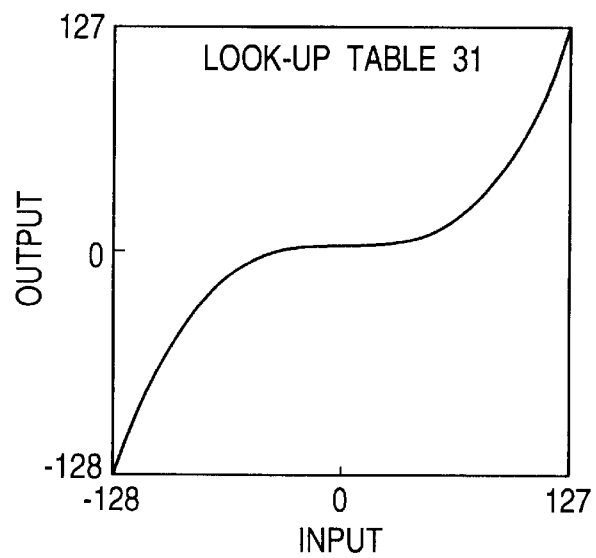
Figure 3C:
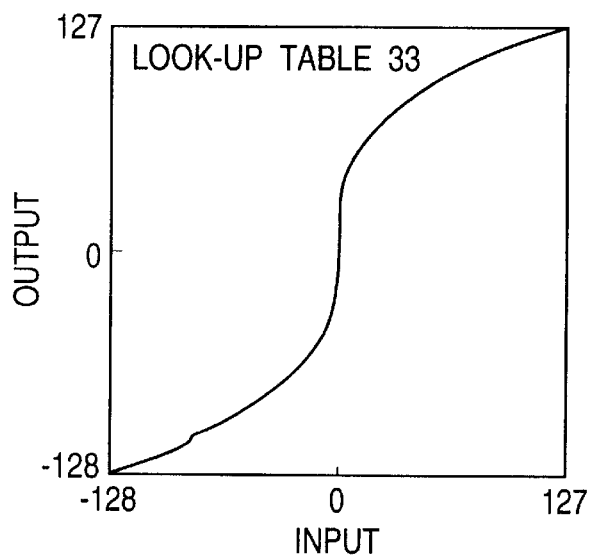

FIG. 3A shows a characteristic of the discrete Laplacian filter 32 and FIGS. 3B and 3C show the contents of the look-up tables 31 an 33 of harmonic generator according to the invention.

The discrete Laplacian filter 32 has a size of 5×5 and removes DC components and the coefficients are given as follows:

| −0.01133 | −0.04848 | −0.06587 | −0.04848 | −0.01133 | (1) |
|---|---|---|---|---|---|
| −0.04848 | −0.05350 | −0.00918 | −0.05350 | −0.04848 | |
| −0.06587 | −0.00910 | −0.94732 | −0.00910 | −0.06587 | |
| −0.04848 | −0.05350 | −0.00918 | −0.05350 | −0.04848 | |
| −0.01133 | −0.04848 | −0.06587 | −0.04848 | −0.01133 | |

To prevent bit underflow, the discrete Laplacian filter 32 is adapted to convert 8-bit input of 0 to 255 into eight bits of −128 to 127.

Further, the look-up table 31 has 3-order nonlinear output normalized in response to 8-bit input of −128 to 127. That is, the look-up table 31 is represented by $$f(x) = x^3 \div 128^2 \quad (2)$$

The look-up table 33 represents inversion of the look-up table 31.

The harmonic component superposing circuit 34 is an adder for adding a value resulting from multiplying an output of the look-up table 33 by weight α corresponding to image signal to image signal G output from the sharpness correction circuit 14.

The effect in the circuit is described as follows:

Output by the discrete Laplacian filter 32 has no DC component. Since the look-up table 31 is of 3-order nonlinear type, its output generates a third harmonic as in Expression (3):

$$\cos(x) = \tfrac{3}{4}\cos(x) + \tfrac{1}{4}\cos(3x) \quad (3)$$

The second term of Expression (3) denotes generation of a third harmonic. The DC component is removed through the discrete Laplacian filter 32 and only the frequency component remains, whereby only the frequency component containing the harmonic component of image signal is extracted.

The harmonic component can also be extracted in various forms such as changing the order of the discrete Laplacian filter 32 and the look-up table 31 or 33 or inserting the look-up table 31 in the stage preceding the discrete Laplacian filter 32. Although the embodiment adopts a third harmonic as a harmonic because the third harmonic has the highest effect on an increase in sharpness, harmonics of other orders can also be easily generated, needless to say.

Figure 4:
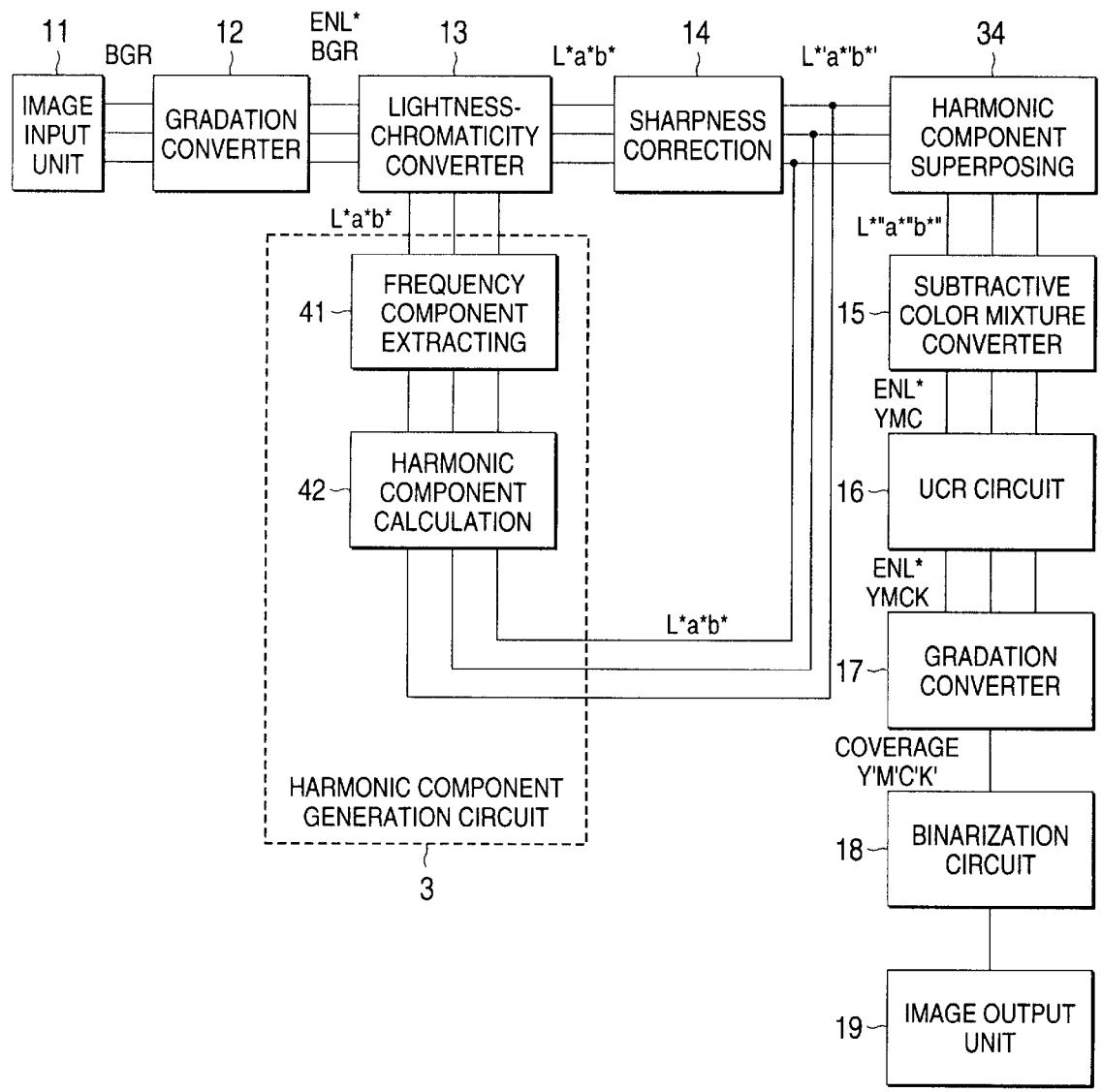
FIG. 4 is a schematic block diagram of a second embodiment of the invention.

Second embodiment:

A second embodiment of the invention will be discussed in detail. FIG. 4 shows a schematic configuration of the second embodiment.

Figure 5A:
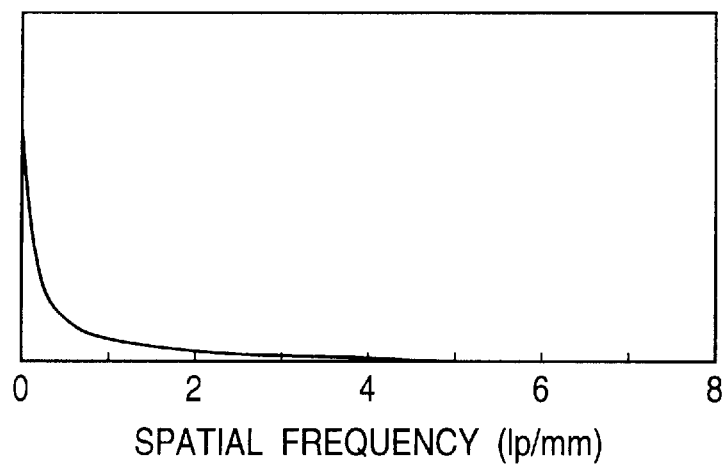
FIGS. 5A and 5B are conceptual drawings representing a characteristic of a harmonic component calculation circuit of the second embodiment of the invention.
Figure 5B:
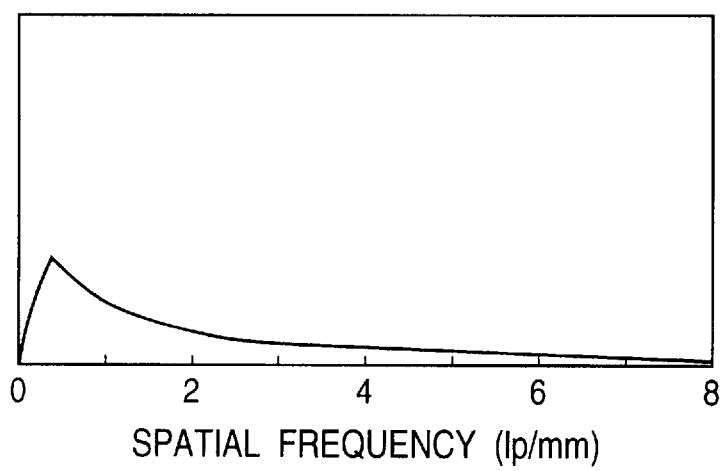

Components identical with or similar to those of the first embodiment previously described with reference to FIG. 2 are denoted by the same reference numerals in FIG. 4 and will not be discussed again. In the second embodiment, a harmonic component generator consists of a frequency component extracting circuit 41 and a harmonic component calculation circuit 42. The frequency component extracting circuit 41 executes discrete Fourier expansion near object pixels. The harmonic component calculation circuit 42 executes enlargement and discrete Laplacian filtering on a spatial frequency dimension near the object pixels, thereby generating a harmonic of the order corresponding to the magnification. FIGS. 5A and 5B show a spatial frequency distribution of input image of the harmonic component calculation circuit 42 and a spatial frequency distribution of output image.

As described above, according to the invention, a harmonic is superposed on a spatial frequency component of an image based on a perception characteristic of a human being for noise, whereby compatibility of improvement in sharpness and reduction in pseudo edges of an image is enabled, providing a good-looking image.

What is claimed is:

1. An image processing system for converting a color image signal through an image input into an image signal applicable to an image output unit, said system comprising:

harmonic component generating means for generating a harmonic component of the color image signal input through said image input unit, said harmonic component generating means including a discrete Laplacian filter and look-up tables for generating the harmonic component; and harmonic component superposing means for superposing the harmonic component, in response to a level of the color image signal, on the image signal.

2. The image processing system as claimed in claim 1 wherein said harmonic component generation means and said harmonic component superposing means generate and superpose a third harmonic component as the harmonic component.

3. An image processing system for converting a color image signal through an image input into an image signal applicable to an image output unit, said system comprising:

harmonic component generating means for generating a harmonic component of the color image signal input through said image input unit, said harmonic component generating means including spatial frequency adjustment means and signal level conversion means for generating the harmonic component; and harmonic component superposing means for superposing the harmonic component, in response to a level of the color image signal, on the image signal.

4. The image processing system as claimed in claim 3 wherein said harmonic component generation means and said harmonic component superposing means generate and superpose a third harmonic component as the harmonic component.

5. The image processing system as claimed in claim 3, said harmonic component generation means including a discrete Laplacian filter and look-up tables and for generating the harmonic component.

6. An image processing system for converting a color image signal through an image input into an image signal applicable to an image output unit, said system comprising:

harmonic component generating means for generating a harmonic component of the color image signal input through said image input unit, said harmonic component generating means including spatial frequency component extraction means and harmonic component calculation means; and harmonic component superposing means for superposing the harmonic component, in response to a level of the color image signal, on the image signal.

7. The image processing system as claimed in claim 6 wherein said harmonic component generation means further includes a discrete Laplacian filter and look-up tables and for generating the harmonic component.

8. The image processing system as claimed in claim 6 wherein said harmonic component generation means and said harmonic component superposing means generate and superpose a third harmonic component as the harmonic component.

9. An image processing method for converting a color image signal through an image input into an image signal applicable to an image output unit, the method comprising the steps of:

generating a harmonic component of the color image signal using a discrete Laplacian filter and look-up tables;

superposing the harmonic component of the color image signal input through said image input unit on the image signal in response to a level of the color image signal; and sending the image signal on which the harmonic component is superposed to said image output unit.

10. The image processing method of claim 9, wherein the step of generating a harmonic component includes the substeps of extracting a spatial frequency from the color image signal; and calculating the harmonic component of the color image signal.

11. The image processing method of claim 9, wherein the step of superposing the harmonic component includes superposing a third harmonic as the harmonic component.

* * * * *